Patented May 8, 1951

2,552,105

UNITED STATES PATENT OFFICE 2,552,105

ALUMINUM WELDING FLUXES

Mike A. Miller and Warren E. Haupin, New Kensington, Pa., assignors to Aluminum Company of America, Pittsburgh, Pa., a corporation of Pennsylvania No Drawing. Application January 15, 1949,
Serial No. 71,224

7 Claims. (Cl. 148—26)

This invention relates to aluminum welding fluxes, particularly fluxes suitable for coating aluminum arc welding rods. Such fluxes should be capable of forming adherent coatings on aluminum arc welding rods, if they are to be applied as coatings; they should have a suitable effect upon the characteristics of the welding arc; and they should produce slags that are readily removed from the work. The fluxes of the invention are especially effective as coatings on aluminum rods for metallic arc welding of aluminum, but they may also be applied in powdered form and in welding processes other than arc welding. Because of the numerous advantages arising from the use of our fluxes in the metallic arc welding of aluminum, the problems in such applications thereof will be first discussed.

Metallic arc welding of aluminum has always been beset by difficulties; the welding rod must be manipulated carefully to obtain smooth deposits of metal and good welds. These difficulties are largely attributable to the fact that the welding arc is unstable; metal transfer from rod to work tends to take place unevenly and the arc tends to sputter and blow. By contrast the metallic arc welding of steel has been comparatively free of these difficulties, the arc being relatively stable and the metal transfer smooth. The principal object of the invention, therefore, is to provide welding fluxes suitable for use in the metallic arc welding of aluminum and capable of effectively stabilizing the arc.

Another difficulty in the metallic arc welding of aluminum arises from the customary use of rods having flux coatings produced from water containing flux mixtures. The moisture in such flux coatings vaporizes and decomposes in the welding process and, consequently, causes the weld metal to be porous, although it appears to have the favorable effect of making the arc a forceful one. To avoid producing porous welds it is necessary to eliminate moisture from flux coatings, but such elimination of moisture ordinarily results in a decrease in the arc "force," exaggerating the instability of the arc. The result is that molten metal accumulates on the rod and then transfers to the work in large drops or globules, with short-circuiting and violent energy surges. Since it is desirable (and often necessary) to employ dry flux coated rods, it is a further object of the invention to provide welding fluxes suitable for use in the metallic arc welding of aluminum and capable of effectively stabilizing the arc even in the absence of moisture. A stable arc is necessary for satisfactory welding, especially if the arc does not have the force characteristic which is exhibited when there is moisture in the flux.

A general object of the invention is, of course, to provide multi-purpose aluminum welding fluxes; and a more particular object is to provide fluxes especially suited to various processes for arc welding aluminum. A further object is to provide aluminum welding fluxes which may be used to produce adherent coatings on aluminum welding rods, coatings which are sufficiently flexible so that they will not readily flake, crack or chip from the rod. A still further and important object is to provide aluminum welding fluxes which will not produce tenacious slags on the work, in whatever form such fluxes are applied.

We have discovered certain new fluxes that are generally suitable for aluminum welding, and particularly suitable for arc welding aluminum by methods employing either bare or coated rods. They may be employed in powdered form and supplied directly to the welding zone, or they may be employed as coatings on aluminum rods. Further, these fluxes adhere well to aluminum welding rods when employed as coatings thereon; they stabilize the welding arc so as to effect soft, quiet, but steady current flow and transfer of molten metal, even in the absence of moisture; they do not induce porosity in the weld when employed dry; and they do not produce difficultly-removable slags on the work.

Generally stated our new fluxes have as the vehicle components thereof at least two alkali metal chlorides, and have as the essential complementary components thereof lithium fluoride, aluminum fluoride and magnesium fluoride. They may also contain relatively small amounts of other materials, particularly as hereinafter recommended. The aforesaid chlorides serve as a vehicle for the aforesaid fluorides and constitute the principal weight of any given flux, while the aforesaid fluorides serve as essential fluxing agents in an arc stabilizing combination and constitute at least the major part of the balance of the weight of the flux.

Of the common alkali metal chlorides, only lithium chloride is significantly hydroscopic; it is best avoided when dry fluxes are desired. Of the fluorides mentioned, none are significantly hydroscopic. Since lithium chloride may be avoided in favor of sodium and potassium chlorides, which are non-hygroscopic alternates, it follows that fluxes composed principally, or entirely, of non-hygroscopic salts may be made up.

Such fluxes are very desirable since they take up the least moisture and can be readily dried, if necessary. Excellent flux coated aluminum welding rods can be made by melting and dehydrating a flux made up of non-hygroscopic salts, and then dipping the aluminum rods in the molten flux bath so that they acquire dry fused coatings. Thereafter it is possible to store or package the fused flux coated rods in a dry atmosphere, so that even small amounts of moisture are not picked up by the flux coating.

Further as to the fluorides, it should be noted that complex fluorides and appropriate combinations of single fluorides are interchangeable for the purpose of providing the essential fluorides in our fluxes. For convenience, however, single fluoride weights will be referred to in specifying the compositions of our fluxes. Complex fluorides that may be formed from single fluorides will not usually be specified herein, it being understood that two or more combinable single fluorides may form one or more complex fluorides, although the fluoride proportions specified will usually permit of there being an excess of one or more of the single fluorides.

The composition ranges for the fluxes of the invention will now be set forth. The principal weight of any flux should be provided by the alkali metal chlorides, these being the vehicle components of the flux. More specifically, the total amount of the alkali metal chlorides should be at least 50 per cent by weight of the entire flux, and less than about 85 per cent (preferably 60 to 70 per cent). As with other aluminum welding fluxes having an alkali metal chloride vehicle, two or more such chlorides may be employed, each in individual amounts between about 5 and 60 per cent, to provide the total amount required. We prefer to employ sodium chloride and potassium chloride, which may conveniently and effectively be present in amounts of about 20 to 40 per cent by weight of sodium chloride (preferably 25 to 35 per cent), and about 25 to 45 per cent of potassium chloride (preferably 30 to 40 per cent). It is often preferable to use a slightly greater amount of potassium chloride than sodium chloride; but approximately equal parts of these chlorides are usually satisfactory.

The major portion of the balance of the weight of any flux (over and above the alkali metal chloride weight) should be provided by the following fluorides: lithium fluoride, aluminum fluoride and magnesium fluoride, these being the essential complementary components of the flux. More specifically, the total amount of these essential fluorides should be at least about 15 per cent by weight of the entire flux, and less than 50 per cent (preferably 25 to 35 per cent). Further the total weight provided by the alkali metal chlorides and the essential fluorides may equal 100 per cent, to the exclusion of other flux components, and preferably is at least 90 per cent when other components not significantly deleterious thereto are included, particularly as hereinafter recommended.

Further, we have discovered that the essential fluorides must be present in certain critical relative amounts in order to produce welding fluxes which will both stabilize the welding arc and form easily removable slags. For these purposes, it is first necessary that the ratio of the aluminum fluoride to the magnesium fluoride be between about 0.12 to 1 and about 1.2 to 1 by weight. Within these ratios, it is also necessary that the lithium fluoride be present in amount between about 10 and 80 parts per hundred parts by weight of all of the essential fluorides contained in the flux, that said aluminum fluoride further be present in amount between about 10 and 40 parts per hundred as aforesaid, and that said magnesium fluoride further be present in amount between about 10 and 80 parts per hundred as aforesaid. The best fluxes according to our discovery are made with the following fluoride contents: lithium fluoride, about 37 to 55 parts per hundred parts by weight of all of the essential fluorides contained in the flux; aluminum fluoride, about 10 to 30 parts per hundred as aforesaid; and magnesium fluoride, about 22 to 50 parts per hundred as aforesaid, with the ratio of said aluminum fluoride to said sodium fluoride being between about 0.25 to 1 and about 1.2 to 1 by weight.

In contrast to most prior fluxes for coating aluminum welding rods, which usually contain cryolite, or sodium fluoride and aluminum fluoride in the proportion existing in cryolite, the fluxes described above need contain no sodium fluoride in any form. Further, the fluxes of the invention each contain a substantial amount of lithium fluoride. However, a fluoride combination consisting of lithium fluoride and aluminum fluoride alone (or with magnesium fluoride in amounts smaller than those referred to above) tends to produce a weld slag which is somewhat difficult to remove from the work; but if in accordance with this invention, an appropriate amount of magnesium fluoride is included, this disadvantage is overcome.

The fluxes, as thus far described, have many desirable characteristics, such as a stabilizing effect on the arc, and a fluxing action which produces easily removable slags. However, further improvements in arc stabilizing and rod adherence properties of these fluxes are obtained, without causing the formation of unduly tenacious slags when the fluxes are used, if sulfur in forms and amounts hereinafter mentioned and any alkaline earth in forms and amounts hereinafter mentioned are included in these fluxes. The sulfur content may be supplied in suitably available form from the group consisting of sulfur, the alkali metal sulfides and sulfates, and the alkaline earth sulfides and sulfates; the total weight of sulfur supplied should be between about 0.1 and 2 per cent. The alkaline earth content may be provided by any of the alkaline earth compounds, particularly the alkaline earth chlorides, fluorides, sulfides or sulfates (the sulfides and sulfates mentioned obviously will supply the desired sulfur content as well); the total weight of alkaline earth provided should be between about 0.15 and 5 per cent.

Both the desired sulfur content and the desired alkaline earth content may be most conveniently and effectively provided, within the limits for each as stated above, by incorporating, as a further component in the fluxes described, at least one alkaline earth sulfate in total amount between about 0.5 and 10 per cent by weight (preferably 2 to 6 per cent). Strontium sulfate is most effective, but calcium sulfate is also very effective and somewhat cheaper.

Instead of employing a single flux of the type described, two or more mixtures of flux components may be employed in juxtaposition as the equivalent thereof, provided the average composition of the mixtures is within the composition ranges stated for the invention. For example, two flux baths may be employed for coating welding rods, the first producing an inner coating which adheres especially well to the rod, and the second producing an outer coating making up the necessary overall composition of the flux combination.

Specific examples of the fluxes of the invention are given in the following tables and some of their performance characteristics are thereafter mentioned.

*Table I.—Typical flux compositions (per cent)*

|  | K | L | M | N | O | P | Q |
|---|---|---|---|---|---|---|---|
| NaCl | 33 | 21.25 | 41 | 33 | 27 | 33 | 34.25 |
| KCl | 34 | 31.25 | 41 | 34 | 27 | 33 | 34.25 |
| LiF | 4.5 | 13.5 | 6.75 | 13.5 | 21.5 | 15 | 15.5 |
| AlF₃ | 4.5 | 13.5 | 2.25 | 4.5 | 6.75 | 7.5 | 7.75 |
| MgF₂ | 21 | 16 | 6 | 12 | 18 | 8 | 8.25 |
| CaSO₄ |  |  | 3 | 3 |  |  |  |
| SrSO₄ | 3 | 4.5 |  |  |  | 3.5 |  |

*Table II.—Chlorides in typical fluxes*

|  | K | L | M | N | O | P | Q |
|---|---|---|---|---|---|---|---|
| Totals: (Table I) | 67 | 52.5 | 81 | 63 | 54 | 66 | 68.5 |
| Ratios: KCl/NaCl | 1+ | 1.5 | 1 | 1+ | 1 | 1 | 1 |

*Table III.—Fluorides in typical fluxes*

|  | K | L | M | N | O | P | Q |
|---|---|---|---|---|---|---|---|
| Totals: (Table I) | 30 | 43 | 15 | 30 | 46.25 | 30.5 | 31.5 |
| Parts/100: |  |  |  |  |  |  |  |
| LiF | 15 | 31.5 | 45 | 45 | 46.5 | 49.25 | 49.25 |
| AlF₃ | 15 | 31.5 | 15 | 15 | 14.5 | 24.5 | 24.5 |
| MgF₂ | 70 | 37 | 40 | 40 | 39 | 26.25 | 26.25 |
| Ratios: AlF₃/MgF₂ | 0.21 | 0.85 | 0.37 | 0.37 | 0.37 | 0.94 | 0.94 |

In addition to the flux compositions given in Table I, hundreds of other flux compositions have been tested and the examples are to be understood as chosen to illustrate various important aspects of the invention without illustrating every composition variation possible. Fluxes K, L, M and O fall within the broader composition ranges (as to fluoride contents) stated for the invention. Fluxes N, P and Q fall within the preferred limits for the invention (as to both chloride and fluoride contents), fluxes N and P (most preferred) being two of the most successful fluxes which we have used. All of the fluxes given as examples are capable of maintaining an arc that is stable, and that has adequate force. These fluxes may be used as coatings and will adhere very well to the rod, yet the slag produced by these fluxes comes off the work very cleanly with a slight tapping of the work.

The characteristic capacity of the fluxes of the invention for stabilizing a welding arc can readily be determined quantitatively when current (or voltage) records are made by means of a recording meter connected across the welding circuit. Such records have shown the following comparative results. When typical prior art fluxes were used to perform a standard welding operation, the welding current varied about 10 to 15 amperes above and below the mean current value. However, when fluxes of the invention were used, the welding current varied only about 3 to 5 amperes above and below the mean current value. These small variations in welding current, obtained when fluxes of the invention were employed, are no greater than the moderate variations found to prevail in the metallic arc welding of steel; they indicate that the fluxes of the invention are significantly improved over those previously employed in aluminum welding, since such stable arc conditions have not heretofore been obtained in aluminum arc welding.

As was indicated previously an aluminum welding rod may be given a dry coating when dipped one or more times in one or more dehydrated fused flux baths. The preferred procedure is to preheat the bare aluminum rod to a temperature as high as about 1020° F. before dipping and to maintain the flux bath or baths at temperatures as high as about 1110 to 1200° F., depending on the melting point of the flux and that of the rod. Likewise, flux slurries may be used to produce rod coatings, particularly if an absolutely dry flux is not necessary. The aluminum welding rods referred to throughout this specification are, of course, made of aluminum or an aluminum base alloy selected for the welding and other characteristics desired, the word "aluminum" being generally used herein to designate aluminum of various grades of purity and also aluminum base alloys.

What is claimed is:

1. An aluminum welding flux composed of non-hygroscopic salts, having as the vehicle components constituting the principal part by weight thereof at least two alkali metal chlorides, and having as the essential complementary components constituting at least the major part of the balance of the weight thereof lithium fluoride, aluminum fluoride and magnesium fluoride, said essential fluorides being present in a total amount of at least about 15 per cent by weight of the entire flux and in relative amounts as follows: the ratio of the aluminum fluoride to the magnesium fluoride being between about 0.12 to 1 and about 1.2 to 1 by weight, the lithium fluoride being present in amount between about 10 and 80 parts per hundred parts by weight of said essential fluorides, said aluminum fluoride further being present in amount between about 10 and 40 parts per hundred parts by weight of said essential fluorides, and said magnesium fluoride further being present in amount between about 10 and 80 parts per hundred parts by weight of said essential fluorides.

2. An aluminum welding flux according to claim 1 in which said vehicle components are sodium chloride and potassium chloride and the amount of potassium chloride is at least equal to the amount of sodium chloride.

3. An aluminum welding flux according to claim 1 having as a further component thereof a total weight of sulfur between about 0.1 and 2 per cent made available from the group consisting of sulfur, the alkali metal sulfides and sulfates, and the alkaline earth sulfides and sulfates, and containing at least one alkaline earth compound providing in the flux a total alkaline earth weight between about 0.15 and 5 per cent.

4. An aluminum welding flux composed of non-hygroscopic salts, having as the vehicle components constituting the principal part by weight thereof sodium chloride and potassium chloride, and having as the essential complementary components constituting at least the major part of the balance of the weight thereof lithium fluoride, aluminum fluoride and magnesium fluoride, said essential fluorides being present in a total amount of at least about 15 per cent by weight of the entire flux and in relative amounts as follows: the ration of the aluminum fluoride to the magnesium fluoride being between about 0.25 to 1 and about 1.2 to 1 by weight, the lithium fluoride being present in amount between about 37 and 55 parts per hundred parts by weight of said essential fluorides, said aluminum fluoride further being present in amount between about 10 and 30 parts per hundred parts by weight of said essential fluorides, and said magnesium fluoride further being present in amount between about 22 and 50 parts per hundred parts by weight of said essential fluorides.

5. An aluminum welding flux according to claim 4 in which the amount of potassium chloride is at least equal to the amount of sodium chloride.

6. An aluminum welding flux according to claim 4 having as a further component thereof at least one alkaline earth sulfate in total amount between about 0.5 and 10 percent by weight.

7. An aluminum welding flux composed of non-hygroscopic salts comprising about 33 per cent by weight sodium chloride, about 33 per cent by weight potassium chloride, about 15 per cent lithium fluoride, about 7.5 per cent aluminum fluoride, about 8 per cent magnesium fluoride, and about 3.5 per cent alkaline earth sulfate.

MIKE A. MILLER.
WARREN E. HAUPIN.

REFERENCES CITED

The following references are of record in the file of this patent:

UNITED STATES PATENTS

| Number | Name | Date |
|---|---|---|
| 922,523 | Schoop | May 25, 1909 |
| 1,550,280 | Post | Aug. 18, 1925 |
| 2,357,125 | Miller | Aug. 29, 1944 |
| 2,456,609 | Andrews | Dec. 21, 1948 |

FOREIGN PATENTS

| Number | Country | Date |
|---|---|---|
| 158,890 | Switzerland | Feb. 16, 1933 |
| 849,311 | France | Aug. 11, 1939 |